United States Patent
Kawabe

(10) Patent No.: US 8,587,889 B2
(45) Date of Patent: Nov. 19, 2013

(54) DISK STORAGE APPARATUS, DISK CONTROL APPARATUS AND WRITE CONTROL METHOD

(75) Inventor: Takayuki Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 25 days.

(21) Appl. No.: 13/348,442

(22) Filed: Jan. 11, 2012

(65) Prior Publication Data

US 2012/0307400 A1   Dec. 6, 2012

(30) Foreign Application Priority Data

May 31, 2011   (JP) ................................ 2011-122417

(51) Int. Cl.
*G11B 19/04* (2006.01)
*G11B 5/02* (2006.01)
*G11B 15/12* (2006.01)
*G11B 5/596* (2006.01)

(52) U.S. Cl.
USPC ............... 360/60; 360/57; 360/62; 360/77.02

(58) Field of Classification Search
None
See application file for complete search history.

(56) References Cited

U.S. PATENT DOCUMENTS 7,245,447 B2 *   7/2007   Zaitsu ............................ 360/60

FOREIGN PATENT DOCUMENTS

| JP | 08-106742 | 4/1996 |
| JP | 2002-092803 | 3/2002 |
| JP | 2000280223 A | 3/2002 |
| JP | 2007-073138 | 3/2007 |
| JP | 2008-276875 | 11/2008 |
| JP | 2011507462 A | 3/2011 |

OTHER PUBLICATIONS

Japanese Office Action dated May 29, 2012, filed in Japanese counterpart Application No. 2011-122417, 4 pages.

* cited by examiner

*Primary Examiner* — Andrew L Sniezek
(74) *Attorney, Agent, or Firm* — Patterson & Sheridan, LLP

(57) ABSTRACT

According to one embodiment, a disk storage apparatus includes a write module and a controller. The write module is configured to move a write head over a disk, and to perform the shingled write method, recording data in the first track while erasing data from a part of the second, i.e., adjacent track. The controller is configured to acquire a first head positioning error with respect to the first track and a second head positioning error with respect to the second track. If the first head positioning error exceeds an off-track threshold value, indicating that the data may no longer be maintained in the first and second tracks, the controller inhibits the data writing.

15 Claims, 8 Drawing Sheets

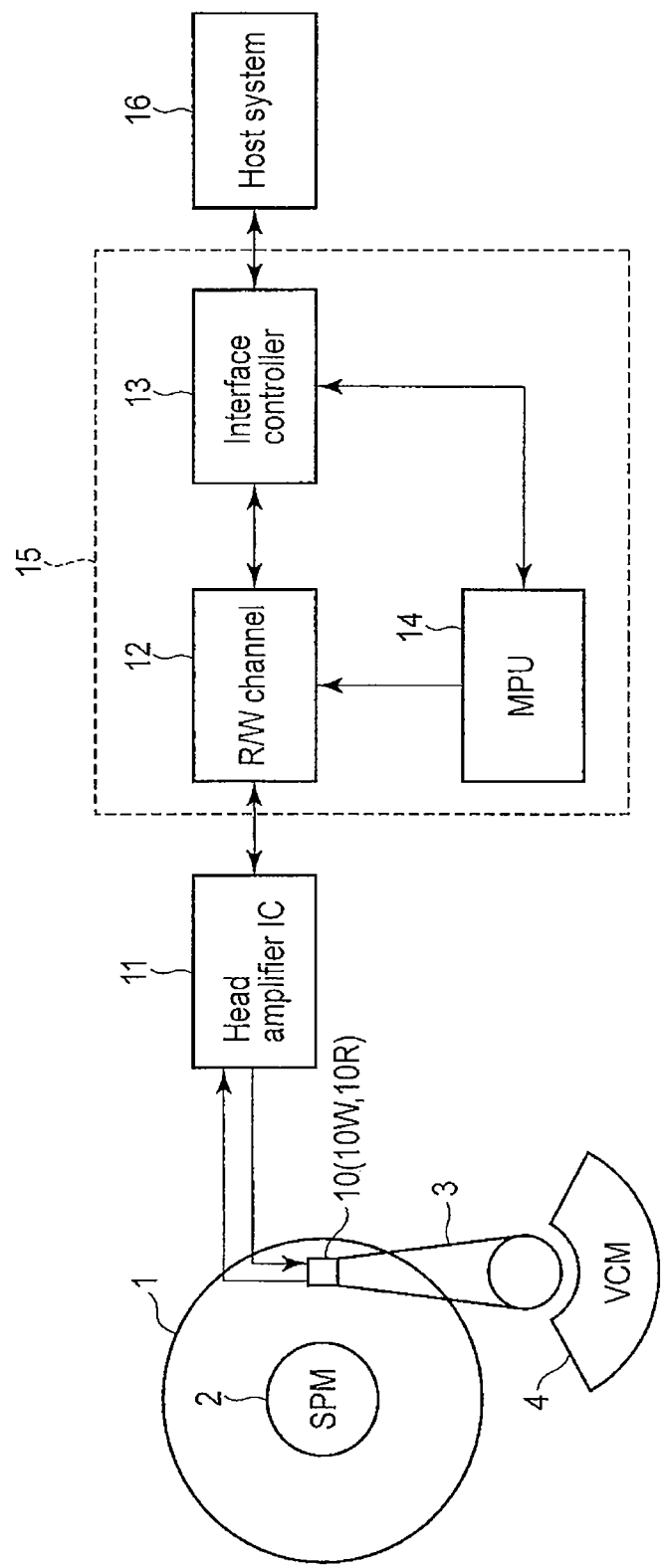
F I G. 1

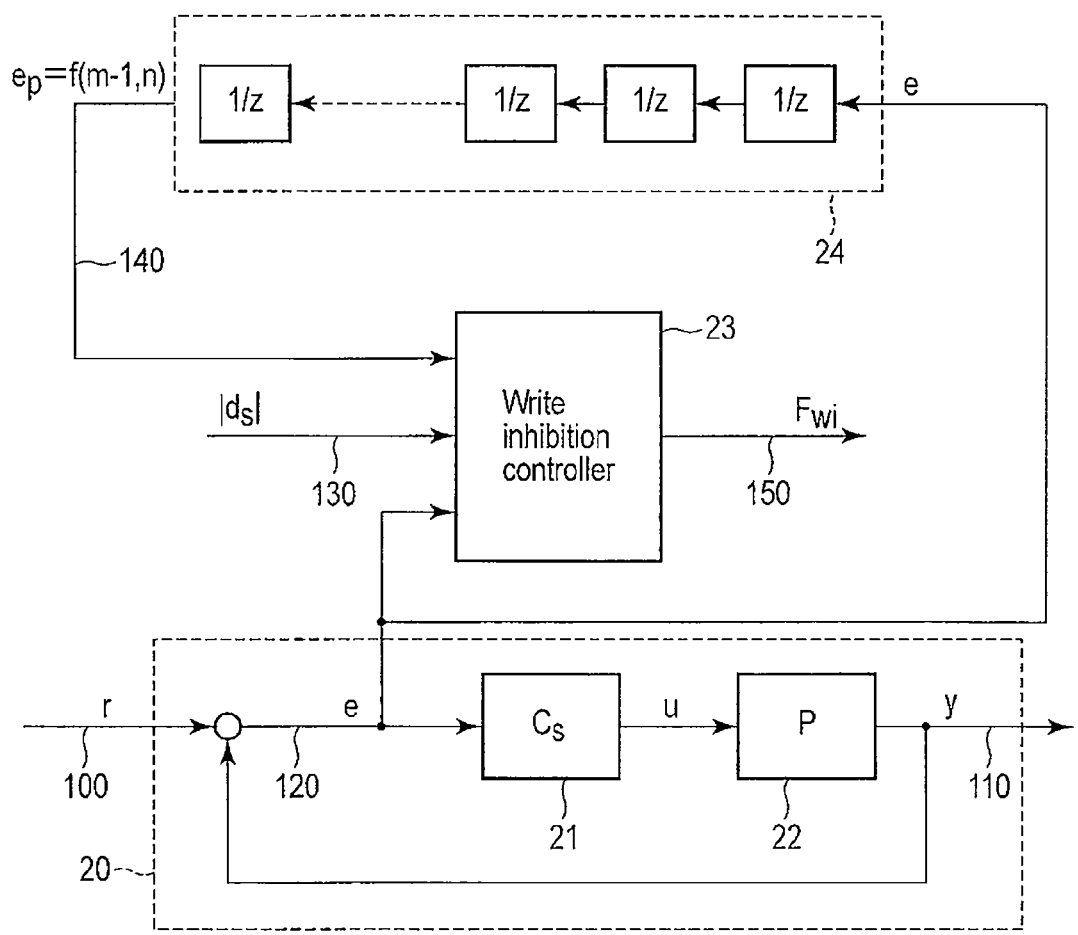
F I G. 2

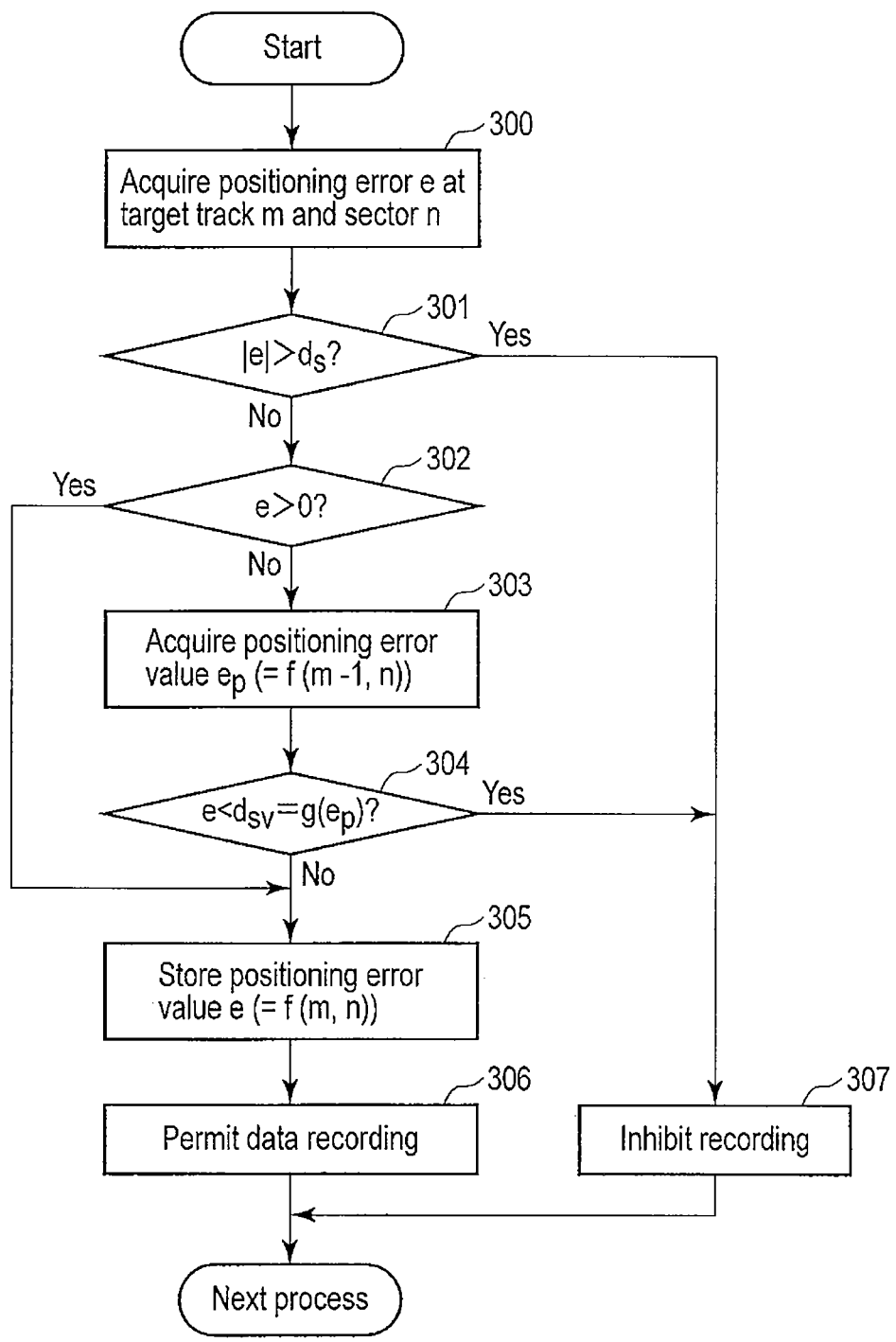
F I G. 3

FIG. 4A Servo gate signal SG

FIG. 4B Positioning error signal e

FIG. 4C Recording inhibition flag Fwi

FIG. 4D Write gate signal WG

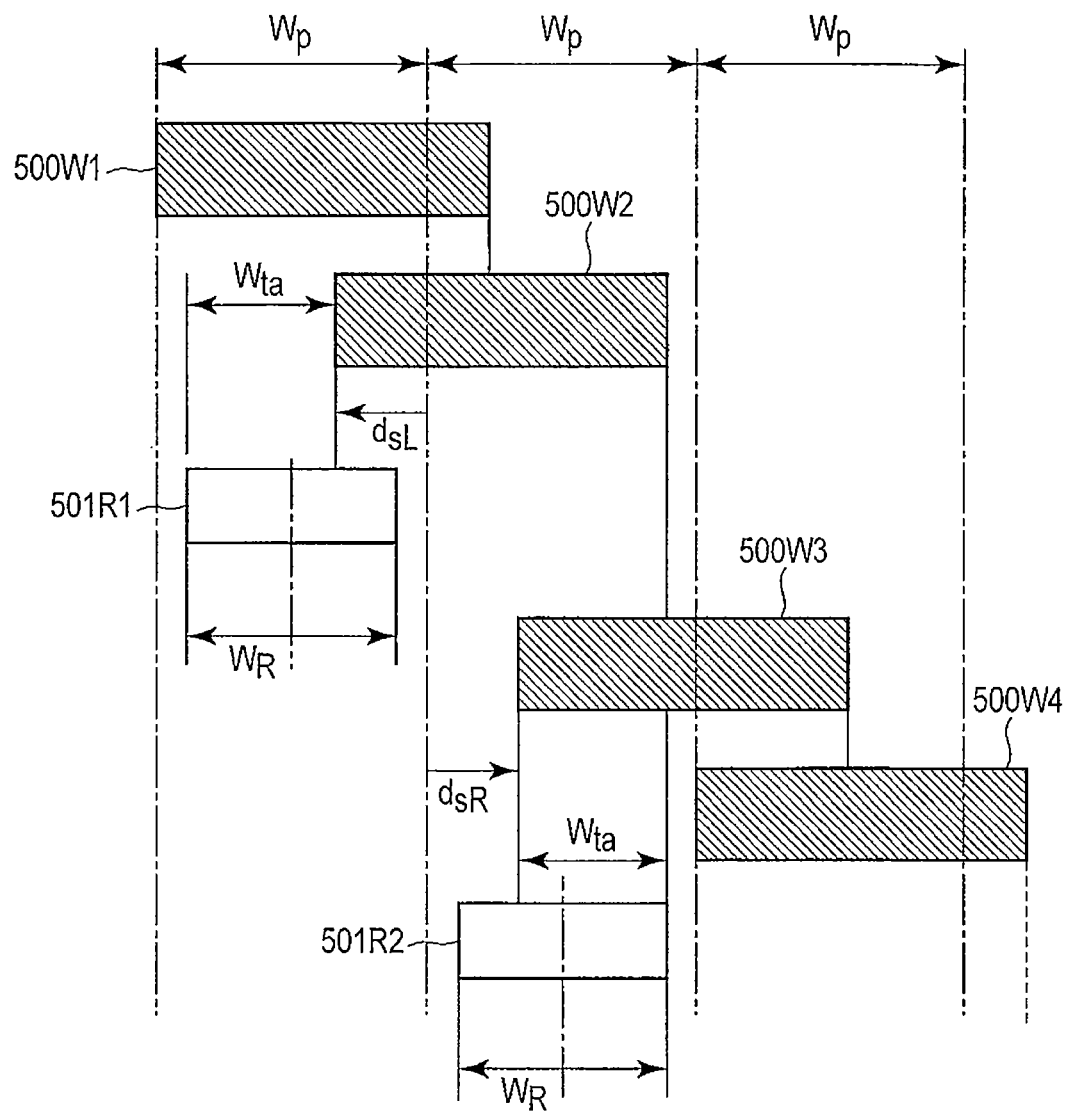
F I G. 5

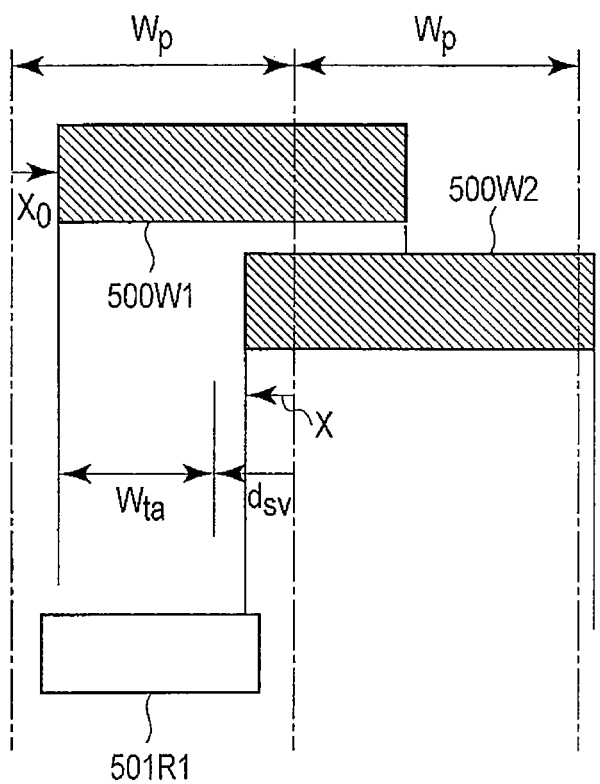
F I G. 6

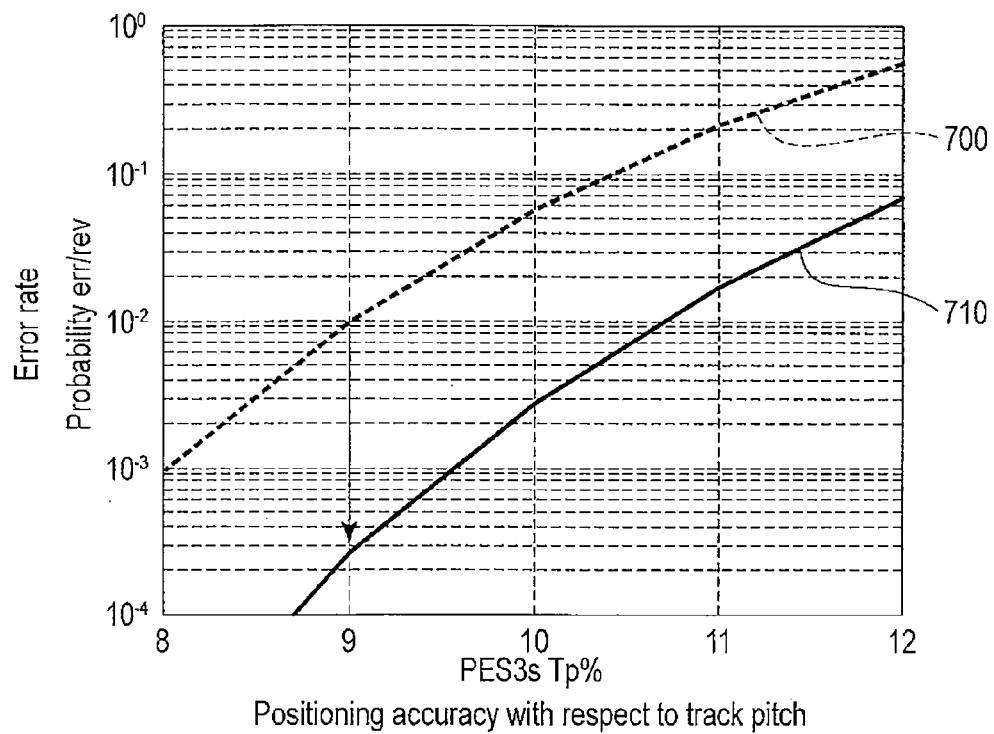
F I G. 7
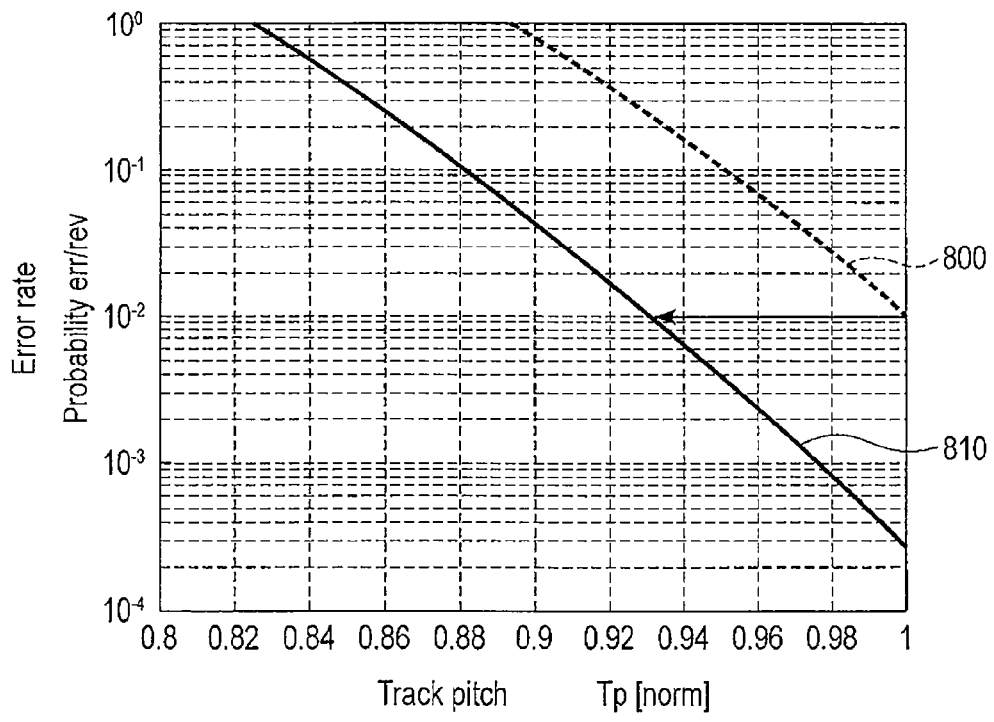
F I G. 8

DISK STORAGE APPARATUS, DISK CONTROL APPARATUS AND WRITE CONTROL METHOD

CROSS-REFERENCE TO RELATED APPLICATIONS

This application is based upon and claims the benefit of priority from prior Japanese Patent Application No. 2011-122417, filed May 31, 2011, the entire contents of which are incorporated herein by reference.

FIELD

Embodiments described herein relate generally to a disk storage apparatus configured to perform shingled write, a disk control apparatus, and a write control method.

BACKGROUND

Recently, a data write method called "shingled write," which can write data on a disk with a high recording density, has been developed in the field of hard disk drives (hereinafter referred to as "disk drives" in some cases). This method is also known as the "overlapped write method."

In such a write method, data is written on a disk, forming data tracks not spaced apart at all, or rather each track partly overlapping either adjacent track. In other words, the tracks are arranged at a high density on the disk.

In the shingled write method, the write head tracks data tracks one after another, writing data on the disk, while moving in the radial direction of a spinning disk. Therefore, while the write head is writing data in one track, it writes the data also in a part of the immediately preceding track. Hence, data should be written with a specific margin in order to secure an effective area in the preceding data track and to maintain a sufficient recording performance. If the margin is too large, however, the tracks will inevitably be arranged at a lower density on the disk.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram explaining the configuration of a disk drive according to an embodiment;

FIG. 2 is a block diagram explaining a head positioning control system and a write inhibition control system, both according to the embodiment;

FIG. 3 is a flowchart explaining the operation of a write inhibition controller according to the embodiment;

FIG. 5 is a diagram explaining an off-track detecting process according to the embodiment;

FIG. 6 is another diagram explaining the off-track detecting process according to the embodiment;

FIG. 7 is a diagram explaining an advantage of the embodiment;

FIG. 8 is a diagram explaining another advantage of the embodiment; and

DETAILED DESCRIPTION

Figure 4:
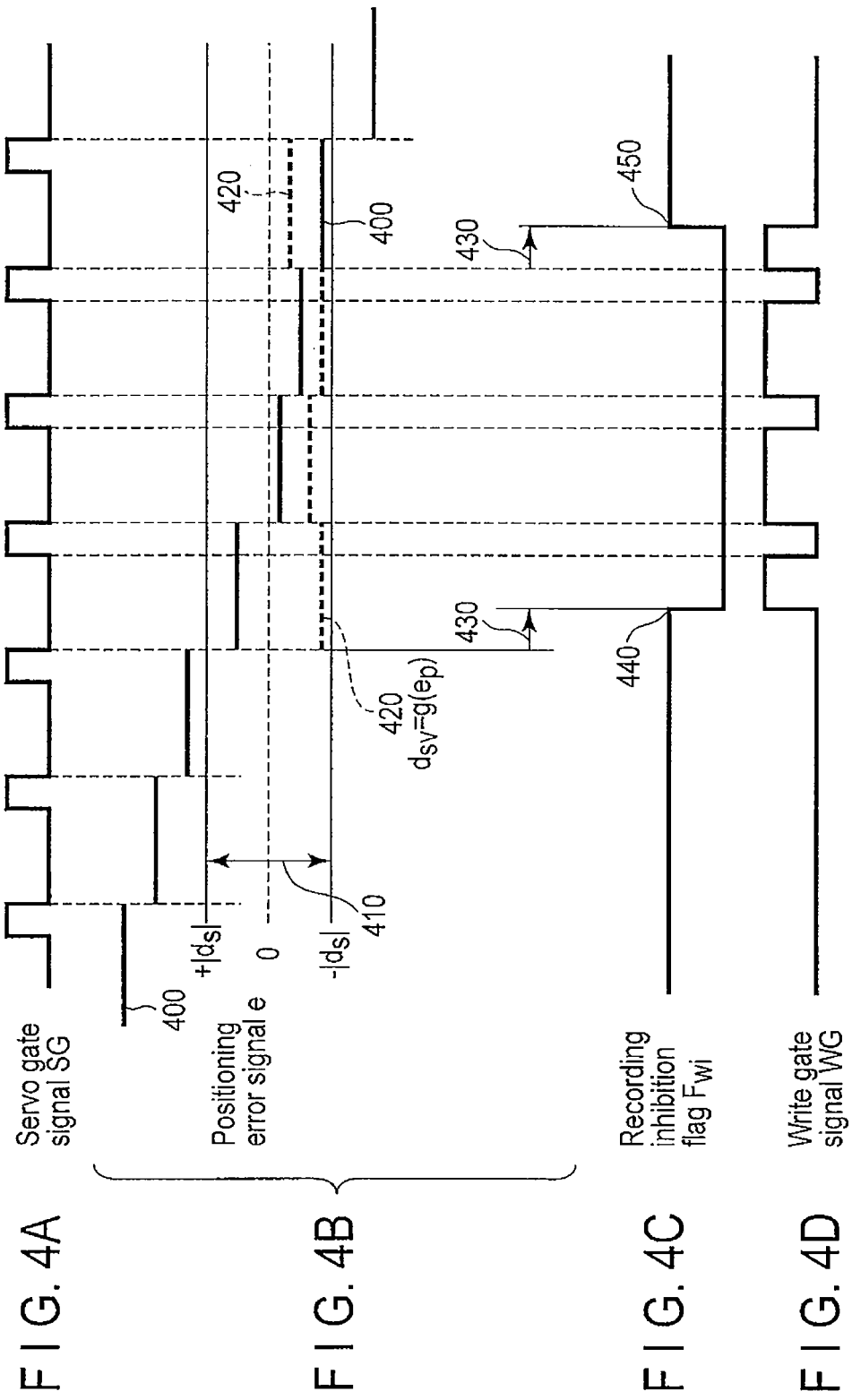
FIGS. 4A, 4B, 4C and 4D are a timing chart explaining the operation of a write inhibition controller according to the embodiment.

Various embodiments will be described hereinafter with reference to the accompanying drawings.

In general, according to one embodiment, a disk storage apparatus includes a write module and a controller. The write module is configured to move a write head over a disk in the radial direction of the disk, and to perform the shingled write method, recording data in the first track while erasing data from a part of the second, i.e., adjacent track. The controller is configured to acquire a first head positioning error with respect to the first track and a second head positioning error with respect to the second track. If the first head positioning error exceeds an off-track threshold value, indicating that the data may no longer be maintained in the first and second tracks, the controller inhibits the data writing. Further, the controller uses the difference between the first head positioning error and the head positioning error made with respect to the second track from which a part of data was erased during the shingled write process, thereby determining such an off-track threshold value as will maintain data in both the first track and the second track.

[Configuration of the Disk Drive]

FIG. 1 is a block diagram showing the major components of a disk drive according to an embodiment.

As shown in FIG. 1, the disk drive comprises, mainly a head-disk assembly (HDA), a head amplifier integrated circuit (IC) 11, and a hard disk controller (HDC) 15.

The HDA has a disk 1, a spindle motor (SPM) 2, an arm 3, and a voice coil motor (VCM) 4. The disk 1 is a recording medium. The SPM 2 rotates the disk 1. The arm 3 holds a head 10. The arm 3 and the VCM 4 constitute an actuator. When the VCM 4 is driven, the arm 3 is rotated, whereby the head 10 held on the arm 3 is moved to a designated position over the disk 1.

The head 10 comprises a slider (i.e., main body), a write head 10W, and a read head 10R. The write head 10W and read head 10R are mounted on the slider. The read head 10R is configured to read data from the data tracks provided on the disk 1. The write head 10W is configured to write data on the disk 1.

The head amplifier IC 11 has a read amplifier and a write driver. The read amplifier is configured to amplify a read signal the read head 10R has read from the disk 1, and to supply the read signal to a read/write (R/W) channel 12. The write driver is configured to receive write data from the R/W channel 12 and to supply a write current according to the write data, to the write head 10W.

The HDC 15 is a one-chip integrated circuit including an interface controller 13 and a microprocessor (MPU) 14, in addition to the R/W channel 12. The R/W channel 12 includes a read channel and a write channel, which are configured to process read data and write data, respectively.

The interface controller 13 performs an interface control, thus controlling the data transfer between a host system (e.g., computer) 16 and the R/W channel 12. The MPU 14 is the main controller in the disk drive, and functions as a servo controller to control the VCM 4, ultimately positioning the head 10. The MPU 14 functions also as a write inhibition controller, as will be described later.

[Write Inhibition Control]

FIG. 2 is a block diagram explaining the configuration of a head positioning control system 20 and a write inhibition control system, both mainly implemented by the MPU 14.

The positioning control system 20 is implanted not only by the software function of the MPU 14, but also by the servo-data playback function of the R/W channel 12 and the VCM driving function of the interface controller 13. The positioning control system 20 has a feedback control system including a servo controller (transfer function Cs) 21 and a plant (transfer function P) 22. The servo controller 21 and the plant 22 control the positioning of the head 10 (i.e., both write head 10W and the read head 10R).

More specifically, the positioning control system 20 calculates a positioning error (e) 120, i.e., difference between a target position (r) 100 for the head 10 and the actual position (y) 110 of the head 10. The positioning control system 20 then drives the plant (P) 22 to eliminate the positioning error (e) 120. The plant (P) 22 is the actuator that includes the VCM 4. The servo controller (Cs) 21 outputs a control value u (i.e., drive current) to drive and control the plant (P) 22.

The actual position (y) 110 of the head 10 is the data the R/W channel 12 has generated. Servo data from which to generate the position data has been recorded on the disk 1. The read head 10R reads servo data from the disk 1. The target position (r) 100 is the track to which the head 10 should be moved. In this embodiment, the target position (r) 100 is equivalent to a target track at which the write head 10W will perform the shingled write method to form a data track on the disk 1.

The write inhibition control system comprises a write inhibition controller 23 and a positioning error memory 24. The write inhibition controller 23 acquires the positioning error (e) 120 from the positioning control system 20, and permits or inhibits the shingled write (or permits or inhibits data recording) as described later, in accordance with the positioning control system 20. As described above, the positioning error (e) 120 is the error the write head 10W has with respect to the target position (r) 100, i.e., target track.

If the write inhibition controller 23 determines that recording should be inhibited, it outputs a recording inhibition flag (Fwi) 150 to the MPU 14. In response to the recording inhibition flag (Fwi) 150, the MPU 14 causes the write head 10W to stop writing data. That is, the write inhibition controller 23 outputs a recording inhibition flag (Fwi) 150 if it determines that the shingled write method being performed in a track may probably degrade the quality of the signal recorded in either adjacent track.

The write inhibition controller 23 refers to the off-track threshold value (absolute value ds) 130 stored in a buffer memory (not shown) and the positioning error value (ep) 140 stored in the positioning error memory 24. The write inhibition controller 23 then evaluates the present positioning error (e) 120. In accordance with the present positioning error, so evaluated, the write inhibition controller 23 permits or inhibits the data recording.

The "off-track threshold value" is the maximum off-track beyond which the write head 10W can no longer write a data signal of sufficient quality while securing an effective area in either adjacent track. That is, if the off-track exceeds the off-track threshold value, no effective areas will be secured in either of the adjacent tracks. If no effective areas are secured in either adjacent track, the read signal read by the read head 10R from either adjacent track will have an intolerably low quality.

The positioning error memory 24 is composed of ring buffer memories, the number of which is as large as the number Ns of servo sectors for one track. From the positioning error memory 24, the write inhibition controller 23 acquires the positioning error value (ep) 140, which was detected when data was recorded in the track m−1 (sector n). In the shingled write method, data is continuously written on the disk 1, while the write head 10W is moving in one direction (for example, from the innermost track toward the outermost track). The write inhibition controller 23 can therefore refer to the positioning error value (ep) made at the time when data was written in a sector of the track immediately preceding the track in which data will be written.

How the write inhibition controller 23 operates will be explained below, with reference to FIG. 3, FIGS. 4A to 4D, FIG. 5 and FIG. 6.

As shown in FIG. 5, the positioning control system 20 moves the write head 10W in one direction over the disk 1 until the write head 10W reaches a target track (m). FIG. 5 shows four write positions 500W1 to 500W4, at which the write head 10W performs shingled write.

The write head 10W has a recording width larger than the track width $W_P$. By contrast, the read head 10R has a reading width $W_R$ smaller than the track width $W_P$. The read head 10R is positioned first at read position 501R1 and then at read position 501R2, and reads data recorded on the disk 1. As seen from FIG. 5, a part of the data recorded over the track width $W_P$ becomes invalid as the write head 10W performs shingled write. As a result, the data recorded over the valid track width $W_P$ remains valid.

Next, as shown in FIG. 3, the write inhibition controller 23 acquires the positioning error (e) 120 from the positioning control system 20 in order to position the write head 10W at sector n of the target track m (Block 300). The write inhibition controller 23 then compares the absolute value of the positioning error (e) 120 with a prescribed threshold value (ds) (Block 301).

As seen from FIG. 5, the prescribed threshold value ds is a static threshold value, either threshold value dsL for the off-track on the left side of the write position 500W2 or threshold value dsR for the off-track on the right side of the write positions 500W3. That is, the value dsL is the threshold at which the preceding data track (i.e., track holding data) can provide a valid width Wta for writing data at the write position 500W2. Conversely, the value dsR is the threshold at which the following data track can provide a valid width Wta for writing data at the write position 500W3, because shingled write is performed in the following data track.

As seen from FIG. 5, the static threshold value ds is given as follows if ds=dsL=dsR:

$$ds = W_P - ((W_P - W_R)/2) - Wta = ((W_P + W_R)/2 - Wta)$$

If the absolute value of the positioning error (e) exceeds the threshold value ds (threshold value dsL), an excessive part of the data in the preceding track (m−1) will be inevitably erased. That is, as seen from FIG. 5, no valid width Wta for writing data in the preceding track can be provided if data is written at the write position 500W2.

If the absolute value of the positioning error (e) exceeds the threshold value ds (same as dsR), an excessive part of the data in the target track (m) is inevitably erased when data is recorded in the following track (m+1). That is, as seen from FIG. 5, no valid width Wta for writing data in the present track can be provided if data is written at the write position 500W4.

Therefore, the write inhibition controller 23 outputs a recording inhibition flag (Fwi) 150 as a high-level signal, for example, if the absolute value of the positioning error (e) exceeds the threshold value ds to the MPU 14 (YES in Block 301). In response to the high-level recording inhibition flag (Fwi) 150, the MPU 14 causes the write head 10W to stop writing data (Block 307).

If the absolute value of the positioning error (e) is equal to or smaller than the threshold value ds (same as dsL), the write inhibition controller 23 determines the polarity of the positioning error (e) (Block 302). The polarity of the positioning error (e) may be positive. This indicates that the write head 10W is off the track toward the following track (m+1) not holding data yet. In other words, the write head 10W has been positioned at the write position 500W1 as shown in FIG. 5.

In this case, the write inhibition controller 23 determines that the write head 10W can write data in the target track (m) (YES in Block 302). The MPU 14 then performs a write permission control to permit the write head 10W to write data (Block 306). At this point, the write inhibition control system acquires, from the positioning control system 20, the error value (e=f(m, n)) made when the write head 10W is positioned at the target track (m) (sector n), and then stores the error value (e=f(m, n)) in the positioning error memory 24 (Block 305). The error value (e=f(m, n)), i.e., positioning error data, will be used to record data in the following track (m+1).

The polarity of the positioning error (e) may be negative as shown in FIG. 3. This indicates that the write head 10W is off the track toward the preceding track (m−1) holding data. That is, the write head 10W has been positioned at the write position 500W2 as shown in FIG. 6. Hence, the write inhibition controller 23 determines that data recording may be inhibited at the target track (m) (NO in Block 302).

In this case, the write inhibition controller 23 acquires, from the positioning error memory 24, positioning error value (ep) (ep=f(m−1, n)) with respect to the track (m−1) holding data as shown in FIG. 2 (Block 303).

As seen from FIG. 6, the write inhibition controller 23 uses the positioning error value (ep), calculating a threshold value dsv for the positioning error (e) in order to secure a track width (i.e., valid width Wta) appropriate for any data track. This threshold value dsv, which is defined as function "g(ep)," is a dynamic threshold value, contrasted to the static threshold value ds.

If the positioning error value (ep) for the preceding track (m−1) is set to $X_0$ as shown in FIG. 6, the write inhibition controller 23 determines a threshold value dsv dynamically from the track width (Wta) that should be secured. That is, the threshold value dsv is equivalent to the maximum off-track value beyond which no data signals of sufficient quality can be recorded. If the polarity of the positioning error (e) is negative, the following relation will be established:

$$|X| < |dsv| = |WP - Wta - X_0|$$

where X is the off-track value.

The write inhibition controller 23 compares the positioning error (e), i.e., a negative value, with the dynamic threshold value dsv (Block 304). If the positioning error (e) is smaller than the dynamic threshold value dsv, the write inhibition controller 23 outputs a recording inhibition flag (Fwi) 150 as a high-level signal (YES in Block 304). That is, if the off-track value |X|, i.e., absolute value of the positioning error (e), exceeds the threshold value |dsv| as shown in FIG. 6, no effective track width (Wta) can be secured for the preceding track (m−1). In this case, more of the data than tolerable will be erased. Therefore, the MPU 14 causes the write head 10W to stop writing data (Block 307).

As the result of the comparison, the positioning error (e) may be found to exceed the dynamic threshold value dsv. In other words, the off-track value |X| may be equal to or less than the threshold value |dsv|. In this case, the write inhibition controller 23 determines that data can be recorded in the target track (m) (NO in Block 304). The MPU 14 therefore goes to a process of permitting the write process (Block 306). The write inhibition control system acquires the positioning error signal (e=f(m, n)) made when the write head 10W is positioned at the target track m (sector n), from the positioning control system 20, and stores the positioning error signal (e) in the positioning error memory 24 (Block 305).

FIGS. 4A to 4D are a timing chart of the write inhibition control described above.

As shown in FIGS. 4A and 4B, the positioning control system 20 generates a positioning error signal (e) in response to a servo gate signal SG output from the interface controller 13 (see solid line 400). FIG. 4B shows a range 410 in which the Write head 10W can be positioned with respect to the center line O of the target track.

If the absolute value of the positioning error (e) falls within a range 410 set in accordance with the static threshold value ds, the write inhibition controller 23 sets the recording inhibition flag (Fwi) to low level 440 upon the elapse of a wait time 430 as shown in FIG. 4C. Therefore, the write head 10W writes data in the track (i.e., range 410) shown in FIG. 4B, in response to a write gate signal WG output from the interface controller 13.

As in FIG. 4B, the positioning error (e) that is a negative value (400) may be below the dynamic threshold value dsv shown as the broken line 420. In this case, an effective track width (Wta) cannot be secured for the preceding track (m−1). Therefore, more of the data than tolerable may be inevitably erased. To prevent this, the write inhibition controller 23 sets the recording inhibition flag (Fwi) to high level 450 upon the elapse of the wait time 430 as shown in FIG. 4C, thereby to inhibit further data recording. As a result, the interface controller 13 stops outputting the write gate signal WG as shown in FIG. 4D, causing the write head 10W to stop writing data.

As has been described, in the disk drive according to this embodiment, which performs a shingled write method to write data on the disk 1, the write inhibition control can be performed by using not only the static threshold value ds, but also the dynamic threshold value dsv. The dynamic threshold value dsv is the threshold value for the off-track calculated for each sector of the preceding track (m−1) from the positioning error (ep) made when data was recorded in the disk 1 at the preceding track (m−1).

Hence, the frequency of relatively intolerable off-tracks can be reduced so long as the track density on the disk 1 and the head positioning accuracy remain unchanged. In other words, data can be written with an appropriate margin, not with an excessive margin. The disk 1 can have a high track density, without degrading the recording performance.

FIG. 7 and FIG. 8 are diagrams explaining the advantages of the present embodiment. In FIG. 7, the head positioning accuracy with respect to the track pitch is plotted on the x-axis, and the recording error rate is plotted on the y-axis. As seen from FIG. 7, at the same positioning error, the recording error rate 710 observed when the write inhibition control is performed by using both the static threshold value ds and the dynamic threshold value dsv is lower than the recording error rate 700 observed when the write inhibition control is performed by using the static threshold value ds only.

In FIG. 8, the track pitch is plotted on the x-axis, and the error rate is plotted on the y-axis. As seen from FIG. 8, at the same positioning error, the recording error rate 810 observed when the write inhibition control is performed by using both the static threshold value ds and the dynamic threshold value dsv is lower by about 7% than the recording error rate 800 observed when the write inhibition control is performed by using the static threshold value ds only.

[Other Embodiment]

Figure 9:
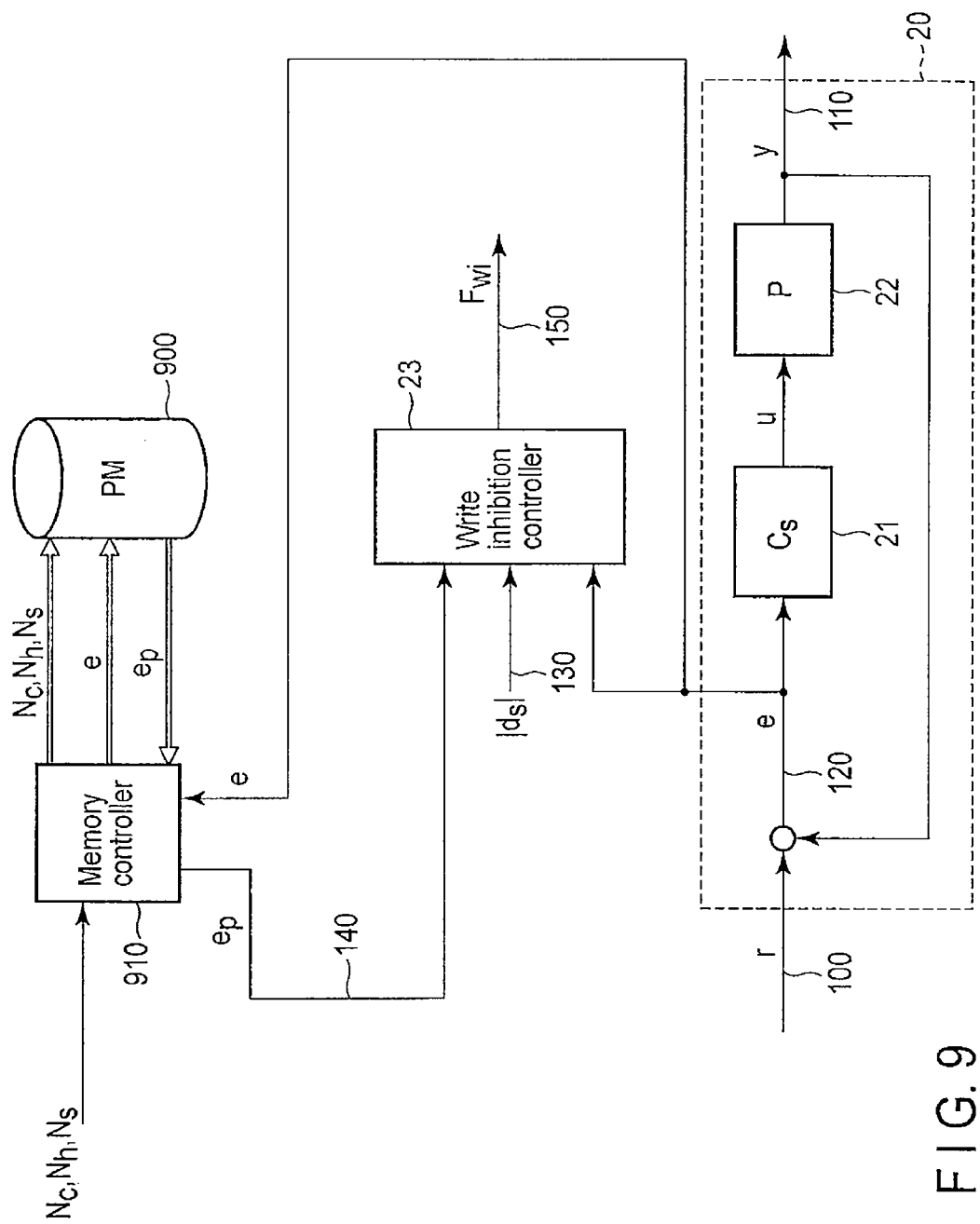
FIG. 9 is a block diagram explaining a head positioning control system and a write inhibition control system, both according to another embodiment.

FIG. 9 is a block diagram showing the configuration of a positioning control system 20 and an inhibition control system, both according to another embodiment. The disk drive according to this embodiment is identical in configuration to the disk drive shown in FIG. 1. Therefore, the configuration of the disk drive according to this embodiment will not be described.

As shown in FIG. 9, the inhibition control system according to this embodiment has a write inhibition controller 23, a positioning error memory 900, and a memory controller 910. The positioning error memory 900 stores the positioning errors (e) for the number of sectors constituting one track, as does the positioning error memory 24 shown in FIG. 2. Alternatively, the positioning error memory 900 may store the positioning errors (e) for the number of sectors constituting two or more adjacent tracks. Still alternatively, the positioning error memory 900 may store the positioning errors (e) for all sectors provided on the disk.

To enable the write inhibition controller 23 to refer to the positioning error (ep) made by the track (m−1) holding data, the memory controller 910 retrieves the positioning error (ep) from the positioning error memory 900 in accordance with the target sector designated (more precisely, the track number Nc, head number Nh and sector number Ns). This positioning error (ep) is an error signal representing the positioning error made when data was recorded in the sector (track number Nc−1, head number Nh and sector number Ns) that is oriented in the direction opposite to the shingled write direction.

If the data has been completely written in the target sector, the memory controller 910 makes access to the positioning error memory 900 and acquires the address of the sector. The memory controller 910 then stores the positioning errors (e) acquired from the positioning control system 20.

Also in this embodiment, the shingled-write inhibition control is performed in the same way as explained with reference to FIG. 1 to FIG. 8. Therefore, neither the shingled-write inhibition control performed in this embodiment nor the advantage this embodiment achieves will be described.

The various modules of the systems described herein can be implemented as software applications, hardware and/or software modules, or components on one or more computers, such as servers. While the various modules are illustrated separately, they may share some or all of the same underlying logic or code. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
a write module configured to move a write head to a first track on a disk, and to record data in the first track with a shingled write operation; and
a controller configured to control operation of the write module,
wherein the controller comprises:
a first acquiring module configured to acquire a first positioning error made when the write head is moved to the first track; and
a second acquiring module configured to acquire a second positioning error made when data is recorded in a second track from which data is erased in part as the shingled write operation is performed at the first track,
wherein the controller is configured to determine an off-track threshold value for securing a valid track width in the first track and a valid track width in the second track using the first positioning error and the second positioning error, and to inhibit the write module from writing data if the first positioning error exceeds the off-track threshold value, and
wherein the controller is further configured to: inhibit the write module from recording data if the absolute value of the first positioning error exceeds the off-track threshold value: acquire a dynamic threshold value corresponding to an off-track limit value tolerable for recording data, based on the second positioning error, if the write head is positioned off toward the second track because of the positioning error of the first track even if the absolute value of the first positioning error does not exceed a prescribed threshold value; and inhibit the write module from recording data if the absolute value of the first positioning error exceeds the dynamic threshold value.

2. The disk storage apparatus of claim 1, further comprising a memory configured to store a positioning error for every sector of a track in which the write module has recorded data,
wherein the controller is configured to acquire the first positioning error for each sector of the first track by the first acquiring module, to acquire from the memory the second positioning error for each sector of the second track, to calculate an off-track threshold value for the first positioning error of each sector based on the first positioning error for each sector and the second positioning error for each sector, and to inhibit the write module from recording data if the first positioning error exceeds the off-track threshold value for each sector.

3. The disk storage apparatus of claim 2, wherein the memory is configured to store the second positioning error with respect to a sector included in the second track which is adjacent to the first track.

4. The disk storage apparatus of claim 2, wherein the memory is configured to store positioning errors with respect to all sectors that are provided on the disk and in which data have been recorded.

5. The disk storage apparatus of claim 1, wherein the controller is configured to inhibit the write module from recording data if the first positioning error exceeds a prescribed value that is the off-track threshold value.

6. A disk control apparatus comprising:
a module configured to control the position of write head in a radial direction of a disk;
a write module configured to record data, by a shingled write operation, in a first track provided on the disk; and
a controller configured to control operation of the write module,
wherein the controller comprises:
a first acquiring module configured to acquire a first positioning error made when the write head is moved to the first track; and
a second acquiring module configured to acquire a second positioning error made when data is recorded in a second track from which data is erased in part as the shingled write operation is performed at the first track, wherein the controller is configured to determine an off-track threshold value for securing a valid track width in the first track and a valid track width in the second track using the first positioning error and the second positioning error, and to inhibit the write module from writing data if the first positioning error exceeds the off-track threshold value, wherein the controller is further configured to: inhibit the write module from recording data if the absolute value of the first positioning error exceeds the off-track threshold value; acquire a dynamic threshold value corresponding to an off-track limit value tolerable for recording data, based on the second positioning error, if the write head is positioned off toward the second track because of the positioning error of the first track even if the absolute value of the first positioning error does not exceed a prescribed threshold value; and inhibit the write module from recording data if the absolute value of the first positioning error exceeds the dynamic threshold value.

7. The disk control apparatus of claim 6, further comprising a memory configured to store a positioning error for every sector of a track in which the write module has recorded data, wherein the controller is configured to acquire the first positioning error for each sector of the first track by the first acquiring module, to acquire from the memory the second positioning error for each sector of the second track, to calculate an off-track threshold value for the first positioning error of each sector based on the first positioning error for each sector and the second positioning error for each sector, and to inhibit the write module from recording data if the first positioning error exceeds the off-track threshold value for each sector.

8. The disk control apparatus of claim 7, wherein the memory is configured to store the second positioning error with respect to a sector included in the second track.

9. The disk control apparatus of claim 7, wherein the memory is configured to store positioning errors with respect to all sectors that are provided on the disk and in which data have been recorded.

10. The disk control apparatus of claim 6, wherein the controller is configured to inhibit the write module from recording data if the first positioning error exceeds a prescribed value that is the off-track threshold value.

11. A write control method for use in a disk storage apparatus comprising a write module configured to move a write head to a first track on a disk and to record data in the first track with a shingled write operation, the method comprising:
acquiring a first positioning error made when the write head is moved to the first track;
acquiring a second positioning error made when data is recorded in a second track from which data is erased in part as the shingled write operation is performed at the first track;
determining an off-track threshold value for securing a valid track width in the first track and a valid track width in the second track using the first positioning error and the second positioning error;
inhibiting the write module from writing data if the first positioning error exceeds the off-track threshold value;
inhibiting the write module from recording data if the absolute value of the first positioning error exceeds the off-track threshold value;
acquiring a dynamic threshold value corresponding to an off-track limit value tolerable for recording data, based on the second positioning error, if the write head is positioned off toward the second track because of the positioning error of the first track even if the absolute value of the first positioning error does not exceed a prescribed threshold value; and
inhibiting the write module from recording data if the absolute value of the first positioning error exceeds the dynamic threshold value.

12. The method of claim 11, the disk storage apparatus comprising a memory configured to store a positioning error for every sector of any track in which the write module has recorded data, the method further comprising:
acquiring the first positioning error for each sector of the first track;
acquiring from the memory the second positioning error for each sector of the second track, calculating an off-track threshold value for the first positioning error of each sector based on the first positioning error for each sector and the second positioning error for each sector; and
inhibiting the write module from recording data if the first positioning error exceeds the off-track threshold value for each sector.

13. The method of claim 12, the memory is configured to store the second positioning error with respect to a sector included in the second track which is adjacent to the first track.

14. The method of claim 12, wherein the memory is configured to store positioning errors with respect to all sectors that are provided on the disk and in which data have been recorded.

15. The method of claim 11, wherein the inhibiting is configured to inhibit the write module from recording data if the first positioning error exceeds a prescribed value that is the off-track threshold value.

* * * * *